(12) United States Patent
Kong (10) Patent No.: US 9,340,236 B2
(45) Date of Patent: May 17, 2016

(54) COWL CROSS MEMBER ASSEMBLY FOR VEHICLE

(71) Applicants: Hyundai Motor Company, Seoul (KR); Kia Motors Corporation, Seoul (KR)

(72) Inventor: Byung Seok Kong, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/502,847

(22) Filed: Sep. 30, 2014

(65) Prior Publication Data

US 2015/0183469 A1    Jul. 2, 2015

(30) Foreign Application Priority Data

Dec. 31, 2013   (KR) .................. 10-2013-0168646

(51) Int. Cl.
| | |
|---|---|
| *B62D 25/14* | (2006.01) |
| *B62D 27/02* | (2006.01) |
| *B62D 1/16* | (2006.01) |
| *B62D 7/22* | (2006.01) |

(52) U.S. Cl.
CPC  *B62D 27/02* (2013.01); *B62D 1/16* (2013.01); *B62D 7/224* (2013.01); *B62D 25/145* (2013.01)

(58) Field of Classification Search
CPC ..... B62D 25/145; B62D 25/147; B62D 25/14
USPC ........... 296/193.02, 72, 192; 180/90; 280/779
See application file for complete search history.

(56) References Cited

U.S. PATENT DOCUMENTS

| | | | | |
|---|---|---|---|---|
| 4,682,788 | A * | 7/1987 | Yoshimura ........... | B62D 25/145 280/779 |
| 5,181,435 | A * | 1/1993 | Khalifa .................. | B62D 1/195 248/900 |
| 5,387,023 | A * | 2/1995 | Deneau ................ | B62D 25/147 296/187.12 |
| 6,450,533 | B1 * | 9/2002 | Kimura ................ | B62D 25/145 180/90 |
| 6,644,690 | B2 * | 11/2003 | Brownlee ................. | B62D 1/16 180/90 |
| 7,152,295 | B2 * | 12/2006 | Goetz ................... | B62D 25/14 180/90 |

(Continued)

FOREIGN PATENT DOCUMENTS

| | | |
|---|---|---|
| EP | 1 816 055 B1 | 12/2010 |
| JP | 2001-63628 A | 3/2001 |

(Continued)

*Primary Examiner* — Gregory Blankenship
(74) *Attorney, Agent, or Firm* — Morgan, Lewis & Bockius LLP (57) ABSTRACT

A cowl cross member assembly for a vehicle for improving convenience in mounting a steering module and avoiding interference with an audio system in a vehicle, may include a main cowl crossbar disposed at a driver's seat in a width direction of the vehicle, a sub-cowl crossbar disposed at a passenger's seat in the width direction of the vehicle, a connection unit disposed between one end of the main cowl crossbar and one end of the sub-cowl crossbar and connecting the main cowl crossbar with the sub-cowl crossbar, a cowl bracket coupled to the main cowl crossbar at one side and coupled to a vehicle body at another side, a steering bracket coupled to a bottom of the cowl bracket and coupled to the steering module, and a steering mounting unit coupled to the main cowl crossbar at one side and coupled to the steering module at another side.

9 Claims, 8 Drawing Sheets

(56) References Cited

U.S. PATENT DOCUMENTS

| | | | | |
|---|---|---|---|---|
| 8,029,045 B2* | 10/2011 | Merkle | B62D 25/145 | 296/193.02 |
| 2005/0134090 A1* | 6/2005 | Kring | B62D 25/145 | 296/193.02 |
| 2007/0175375 A1* | 8/2007 | Watanabe | B62D 25/145 | 114/144 R |
| 2008/0054682 A1* | 3/2008 | Ellison | B62D 25/145 | 296/193.02 |
| 2009/0174223 A1* | 7/2009 | Penner | B62D 25/145 | 296/193.02 |
| 2010/0052366 A1* | 3/2010 | Schmieder | B62D 25/145 | 296/193.02 |
| 2011/0227369 A1* | 9/2011 | Abe | B62D 25/145 | 296/193.02 |
| 2011/0233964 A1* | 9/2011 | Matsutani | B62D 25/145 | 296/193.02 |
| 2012/0049573 A1* | 3/2012 | Atsumi | B62D 25/145 | 296/193.02 |
| 2012/0049574 A1* | 3/2012 | Atsumi | B62D 25/145 | 296/193.02 |
| 2013/0076016 A1* | 3/2013 | Aoki | B62D 1/16 | 280/779 |
| 2014/0001792 A1* | 1/2014 | Aoki | B62D 21/15 | 296/193.09 |
| 2014/0125086 A1* | 5/2014 | Da Costa Pito | B62D 25/145 | 296/72 |
| 2014/0333094 A1* | 11/2014 | Matsushita | B62D 25/145 | 296/193.02 |
| 2015/0145275 A1* | 5/2015 | Baudard | B62D 25/145 | 296/72 |
| 2015/0183469 A1* | 7/2015 | Kong | B62D 1/16 | 296/193.02 |

FOREIGN PATENT DOCUMENTS

| | | |
|---|---|---|
| KR | 10-2011-0121068 A | 11/2011 |
| KR | 10-2013-0033786 A | 4/2013 |

* cited by examiner

COWL CROSS MEMBER ASSEMBLY FOR VEHICLE

CROSS-REFERENCE TO RELATED APPLICATION

The present application claims priority to Korean Patent Application No. 10-2013-0168646 filed Dec. 31, 2013, the entire contents of which is incorporated herein for all purposes by this reference.

BACKGROUND OF THE INVENTION

1. Field of the Invention

The present invention relates to a cowl cross member assembly for a vehicle. More particularly, the present invention relates to a cowl cross member assembly for a vehicle which prevents interference with an audio system in a vehicle, improving convenience in mounting a steering module.

2. Description of Related Art

In general, vehicles are equipped with a steering column fixing a steering wheel and a cowl cross member fixing the steering column to the vehicle bodies.

Since the cowl cross member is fixed directly to a vehicle body, vibration of the vehicle body is fully transmitted to the cowl, and when there is no measure for blocking the vibration, the vibration from the vehicle body is transmitted to the steering column.

In this structure, the steering column is fastened to the cowl cross member with bolts. However, in this case, although the bolts can firmly fasten the steering column and the cowl cross member, they cannot block vibration because they are made of metal. Accordingly, vibration from a vibration source is transmitted to the steering wheel through the cowl cross member and finally to the steering wheel that a driver holds with hands.

Therefore, a driver who drives a vehicle with hands on the steering wheel to which vibration is directly transmitted feels vibration from the steering wheel while the vehicle is idling or running, and the driver feels unpleasant.

Most of vibration in vehicles is the vibration of the vehicle body and the steering system, and when the vibration is transmitted to a driver, the driver feels unpleasant, such that measures for blocking vibration are used.

To this end, a damper is generally used in steering systems to prevent vibration from being transmitted.

However, for the vehicle bodies, unlike the steering systems, vibration is prevented not by blocking vibration, but by improving the strength of the vehicle bodies.

That is, in order to prevent vibration of vehicle bodies from being transmitted to a driver in the related art, vibration is fundamentally reduced not by blocking vibration, but by securing strength of the vehicle bodies.

However, although it is possible to attenuate vibration by increasing strength of vehicle bodies, the weight of the vehicles increases.

On the other hand, in order to solve the problems, a rubber mount is used in some cases to block vibration transmitted to a steering wheel.

That is, in a configuration of the related art, vibration has been blocked by fixing a steering column and a cowl cross member with a rubber mount made of elastic rubber.

However, when a steering column and a cowl cross member are fixed by such a rubber mount, it is possible to prevent vibration of a vehicle body from being transmitted to the steering column by blocking or attenuating the vibration, but it is difficult to secure strength for the characteristics of rubber.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed providing a cowl cross member assembly for a vehicle having advantages of improving convenience in mounting a steering module, preventing distortion, and avoiding interference with an audio system in a vehicle.

According to various aspects of the present invention, a cowl cross member assembly for a vehicle, which is for improving convenience in mounting a steering module and avoiding interference with an audio system in the vehicle may include a main cowl crossbar disposed at a driver's seat in a width direction of a vehicle, a sub-cowl crossbar disposed at a passenger's seat in the width direction of the vehicle, a connection unit disposed between one end of the main cowl crossbar and one end of the sub-cowl crossbar and connecting the main cowl crossbar with the sub-cowl crossbar, a cowl bracket coupled to the main cowl crossbar at one side and coupled to a vehicle body at another side, a steering bracket coupled to the bottom of the cowl bracket and coupled to the steering module, and a steering mounting unit coupled to the main cowl crossbar at one side and coupled to the steering module at another side.

The cowl bracket and the steering bracket may be symmetric at both sides based on a center of the steering module therebetween.

The main cowl crossbar and the sub-cowl crossbar may be connected and mounted to each other by the connection unit with a step therebetween.

The connection unit may include a connection bracket having a fitting hole in which the sub-cowl crossbar is inserted, and a connection plate coupled to the connection bracket and having an insertion hole in which the main cowl crossbar is inserted.

The fitting hole and the insertion hole may be arranged at vertically different positions.

The steering bracket may be inserted inside the bottom of the cowl bracket and welded to the cowl bracket.

The steering mounting unit may include a main steering plate coupled to the main cowl crossbar and having coupling holes at both sides, sub-steering plates coupled to both sides of the main steering plate and each sub-steering plate having a mounting hole corresponding to the coupling holes, reinforcing members inserted in between the main steering plate and the sub-steering plates, supporting an inner side of the main steering plate and the outer sides of the sub-steering plates, and each reinforcing member having a through-hole corresponding to each of the coupling and mounting holes, and steering bolts tightened to the steering module sequentially through the coupling holes, the through-holes, and the mounting holes.

The reinforcing members may be formed in a shape of a pipe.

According to the present invention, it is possible to improve convenience in mounting a steering module, prevent distortion, and avoid interference with an audio system in a vehicle.

Further, since the cowl bracket is welded at three sides, covering the steering bracket, the strength in coupling with the steering module can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The sizes and thicknesses of the configurations shown in the drawings are provided selectively for the convenience of description, such that the present invention is not limited to those shown in the drawings and the thicknesses are exaggerated to make some parts and regions clear.

Further, parts that are not related to the description are not drawn to make exemplary embodiments of the present invention clear.

Figure 1:
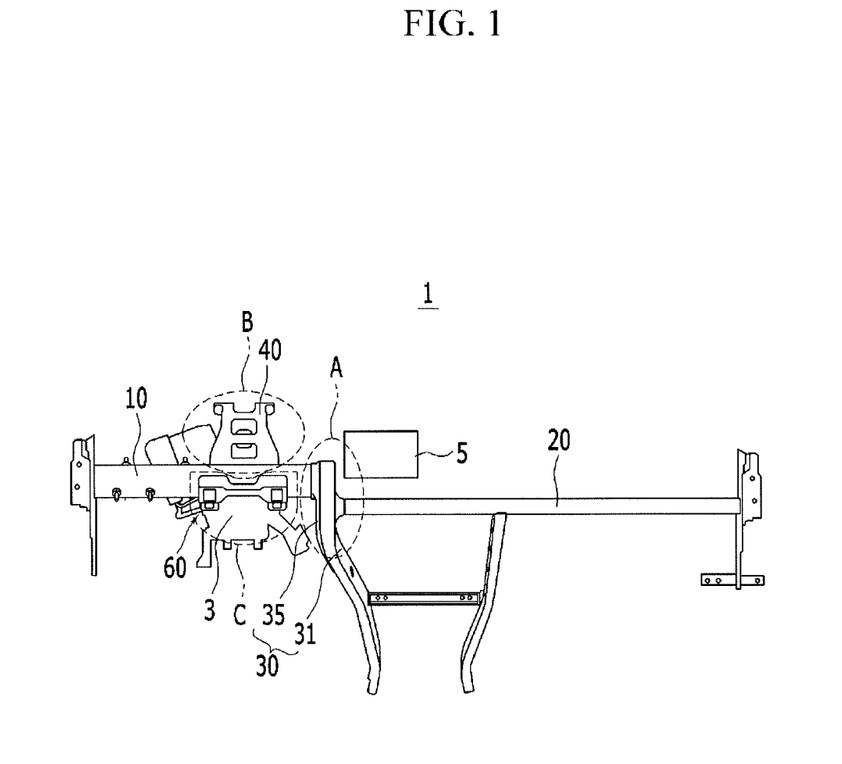
FIG. 1 is a front view showing an exemplary cowl cross member assembly for a vehicle according to the present invention.

FIG. 1 is a front view showing an exemplary cowl cross member for the vehicle according to the present invention.

Referring to FIG. 1, a cowl cross member assembly 1 for a vehicle according to the present invention has a structure for improving convenience in mounting a steering module 3 and avoiding interference with an audio system 5 in a vehicle.

To this end, the cowl cross member 10 for a vehicle includes a main cowl crossbar 10, a sub-cowl crossbar 20, a connection unit 30, a cowl bracket 40, a steering bracket 50, and a steering mounting unit 60.

The main cowl crossbar 10 is disposed at the driver's seat in the width direction of a vehicle and the sub-cowl crossbar 20 is disposed at the passenger's seat in the width direction of the vehicle.

The main cowl crossbar 10 is larger in diameter than the sub-cowl crossbar 20 and the sub-cowl crossbar 20 is longer than the main cowl crossbar 10.

The main cowl crossbar 10 and the sub-cowl crossbar 20 are connected by the connection unit 30 with a step therebetween.

Figure 2:
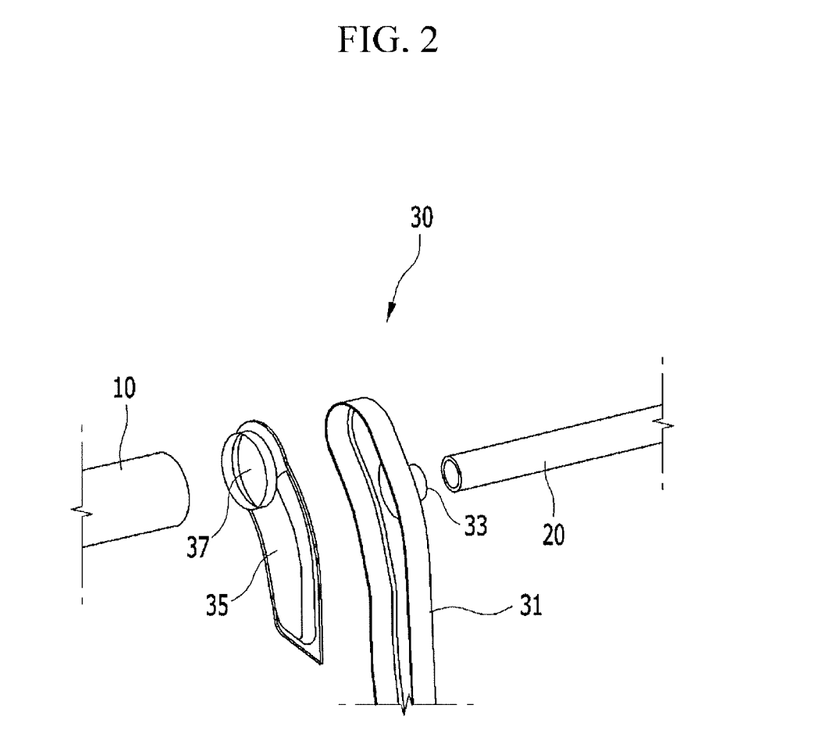
FIG. 2 is an exploded perspective view of portion A of FIG. 1 according to the present invention.
Figure 3:
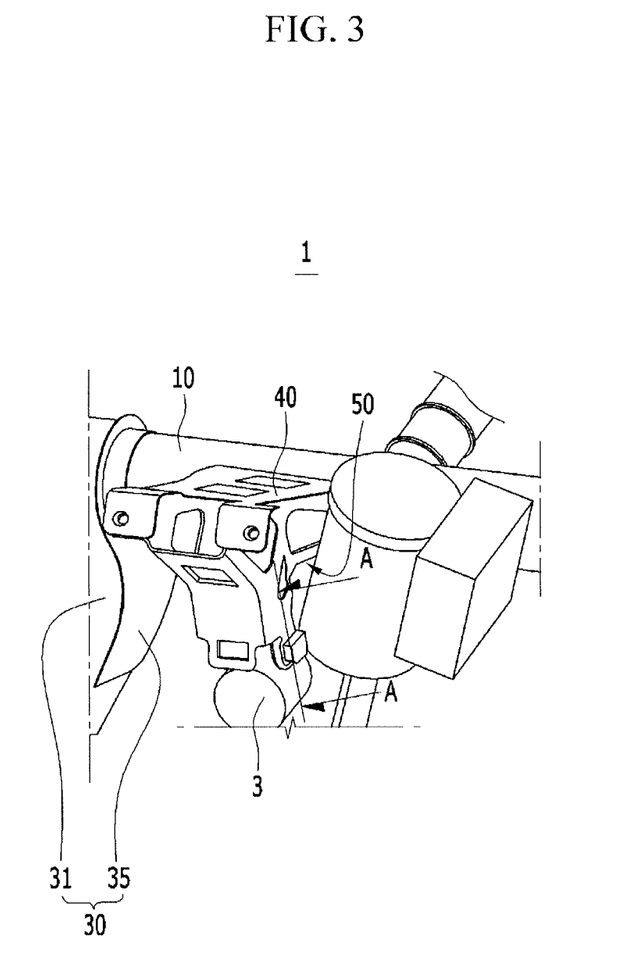
FIG. 3 is an enlarged perspective view of portion B of FIG. 1 according to the present invention.
Figure 4:
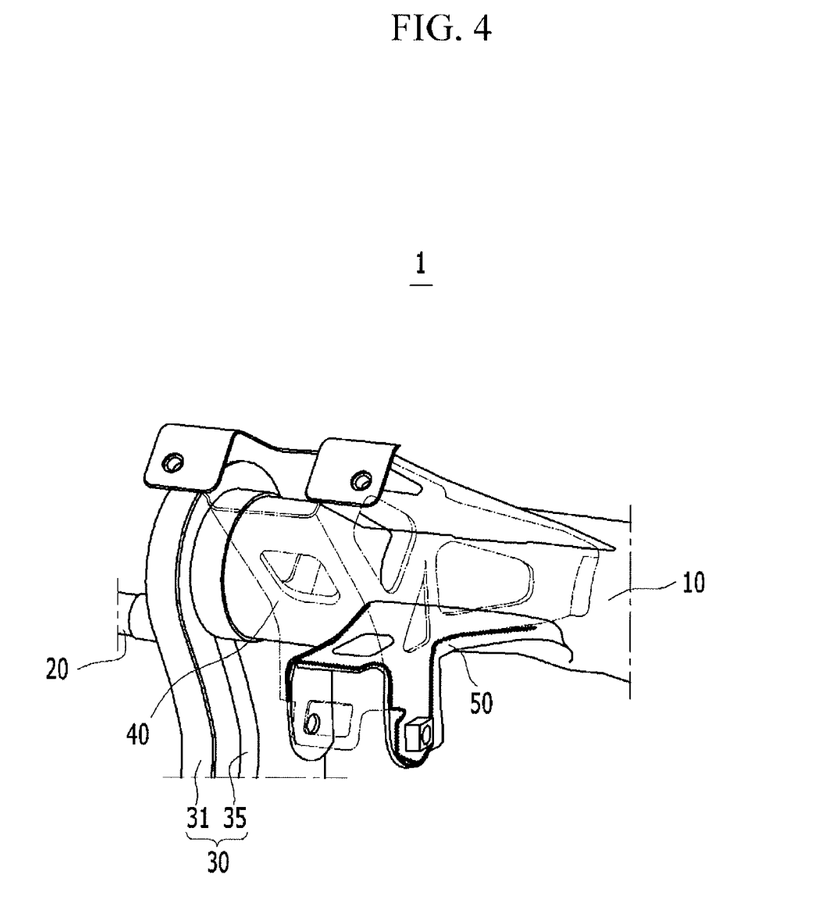
FIG. 4 is perspective view showing a cowl bracket and a steering bracket combined, in the exemplary cowl cross member assembly for the vehicle according to the present invention.

FIG. 2 is an exploded perspective view of the portion A of FIG. 1.

Referring to FIG. 2, the connection unit 30 is disposed between one end of the main cowl crossbar 10 and the sub-cowl crossbar 20 and connects the main cowl crossbar 10 with the sub-cowl crossbar 20.

The connection unit 30 is composed of a connection bracket 31 and a connection plate 35.

The connection bracket 31 has a fitting hole 33 in which the sub-cowl crossbar 20 is inserted.

The connection plate 35 is combined with the connection bracket 31 and has an insertion hole 37 in which the main cowl crossbar 10 is inserted.

The fitting hole 33 and the insertion hole 37 are disposed at vertically different positions.

That is, with the fitting hole 33 and the insertion hole 37 arranged vertically at different positions, the main cowl crossbar 10 is inserted in the insertion hole 37 and the sub-cowl crossbar 20 is inserted in the fitting hole 33, such that the audio system 5 can be easily mounted in the vehicle without interfering with the main cowl crossbar 10 and the sub-cowl crossbar 20.

Referring to FIGS. 3 to 6, the cowl bracket 40 is connected to the main cowl crossbar 10 at one side and coupled to a vehicle body at the other side.

The steering bracket 50 is attached under the bottom of the cowl bracket 40 and fastened to the steering module 3 by a bolt B and a nut N.

The steering bracket 50 is disposed under the bottom of the cowl bracket 40 and welded to the cowl bracket 40.

Figure 5:
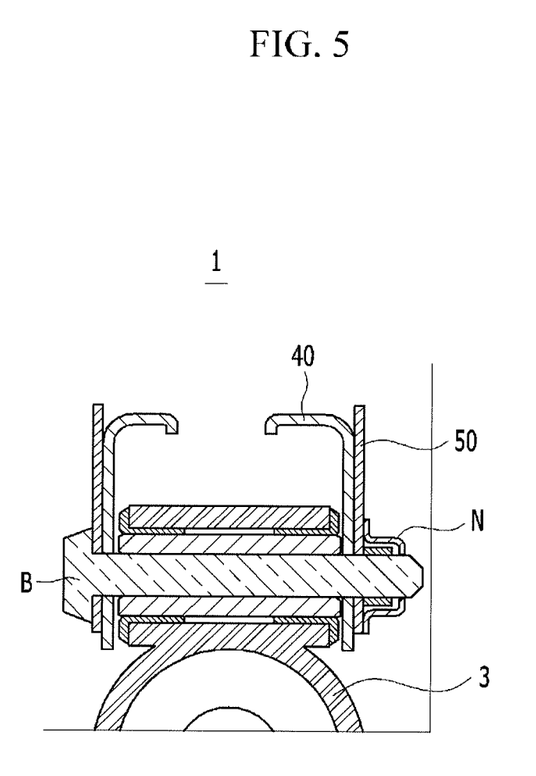
FIG. 5 is a cross-sectional view taken along line A-A in FIG. 3 according to the present invention.

That is, as shown in FIG. 5, the cowl bracket 40 covers the outer side of the steering bracket 50 and the contact sides of the steering bracket 50 and the cowl bracket 40 are welded, such that strength in coupling to the steering module 3 is improved.

Figure 8:
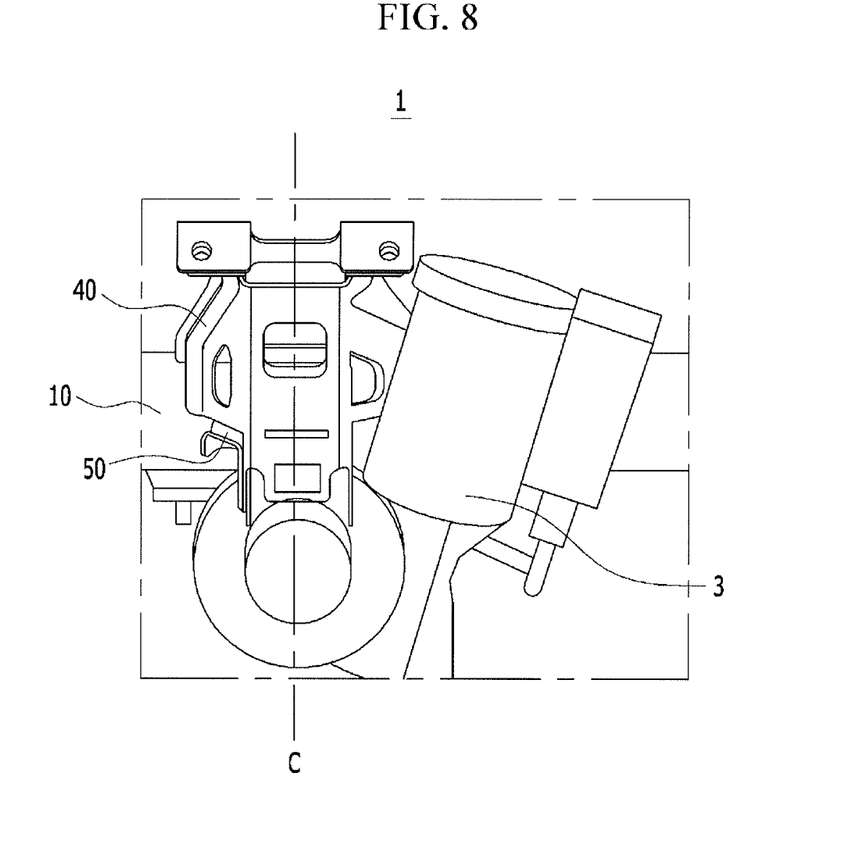
FIG. 8 is a front view of FIG. 3 according to the present invention.

Further, as shown in FIG. 8, the cowl bracket 40 and the steering bracket 50 are symmetric at both sides with the center CTR of the steering module 3 therebetween and it is for effectively supporting them against deformation due to vertical vibration and torque of the steering module 3.

Figure 6:
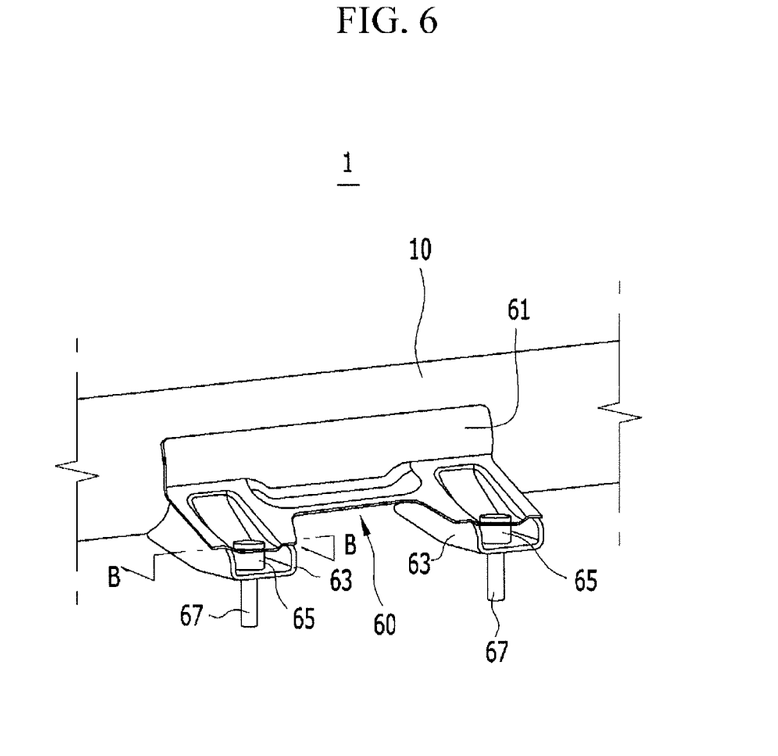
FIG. 6 is an enlarged perspective view of portion C of FIG. 1 according to the present invention.
Figure 7:
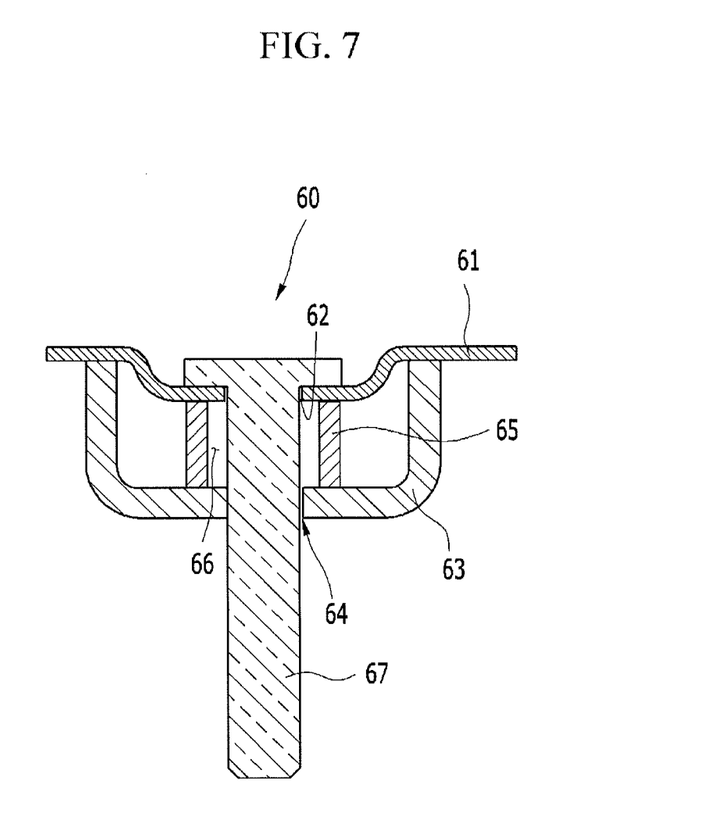
FIG. 7 is a cross-sectional view taken along line B-B in FIG. 6 according to the present invention.

FIG. 6 is an enlarged perspective view of the portion C of FIG. 1 and FIG. 7 is a cross-sectional view taken along line B-B in FIG. 6.

Referring to FIGS. 6 and 7, the steering mounting unit 60 is connected to the main cowl crossbar 10 at one side and coupled to the steering module 3 at the other side.

The steering mounting unit 60 is composed of a main steering plate 61, sub-steering plates 63, reinforcing members 65, and steering bolts 67.

The main steering plate 61 is bonded to the main cowl crossbar 10 and has coupling holes 62 at both sides.

The sub-steering plates 63 are bonded to both sides of the main steering plate 61 and each have mounting holes 64 corresponding to the coupling holes 62.

The main steering plate 61 and the sub-steering plates 63 are, as shown in FIG. 7, bonded with a predetermined distance therebetween, because the steering module 3 deforms by moving up/down when a vehicle is in motion. Accordingly, the main steering plate 61 and the sub-steering plates 63 are bonded with a gap therebetween to prevent the steering module 3 from deforming up/down and left/right.

The reinforcing members 65 are inserted in between the steering plate 61 and the sub-steering plates 63, support the inner side of the main steering plate 61 and the outer sides of the sub-steering plates 63, have through-holes 66 corresponding to the coupling holes 62 and the mounting holes 64, and are formed in the shape of a pipe.

That is, the reinforcing members 65 are disposed in the space between the main steering plate 61 and the sub-steering plates 63 in order to prevent the steering module 3 from deforming up/down and left/right when a vehicle is in motion.

The steering bolts 67 are tightened to the steering module 3 sequentially through the coupling holes 62, the through-holes 66, and the mounting holes 64.

Accordingly, a cowl cross member assembly 1 for a vehicle according to an exemplary embodiment of the present invention can improve convenience in mounting the steering module 3, prevent distortion, and avoid interference with the audio system 5 in a vehicle.

Further, since the cowl bracket 40 is welded at three sides, covering the steering bracket 50, the strength in coupling with the steering module 3 can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cowl cross member assembly for a vehicle which improves convenience in mounting a steering module and avoids interference with an audio system in a vehicle, the cowl cross member assembly comprising:
    a main cowl crossbar disposed at a driver's seat in a width direction of the vehicle;
    a sub-cowl crossbar disposed at a passenger's seat in the width direction of the vehicle;
    a connection unit disposed between one end of the main cowl crossbar and one end of the sub-cowl crossbar and connecting the main cowl crossbar with the sub-cowl crossbar;
    a cowl bracket coupled to the main cowl crossbar at one side and coupled to a vehicle body at another side;
    a steering bracket coupled to a bottom of the cowl bracket and coupled to the steering module; and
    a steering mounting unit coupled to the main cowl crossbar at one side and coupled to the steering module at another side,
    wherein the steering bracket is inserted inside the bottom of the cowl bracket and welded to the cowl bracket.

2. The cowl cross member assembly of claim 1, wherein the cowl bracket and the steering bracket are symmetric at both sides based on a center of the steering module.

3. The cowl cross member assembly of claim 1, wherein the main cowl crossbar and the sub-cowl crossbar are connected and mounted to each other by the connection unit with a step therebetween.

4. The cowl cross member assembly of claim 1, wherein the connection unit includes:
    a connection bracket having a fitting hole in which the sub-cowl crossbar is inserted; and
    a connection plate coupled to the connection bracket and having an insertion hole in which the main cowl crossbar is inserted.

5. The cowl cross member assembly of claim 4, wherein the fitting hole and the insertion hole are arranged at vertically different positions.

6. The cowl cross member assembly of claim 1, wherein the steering mounting unit includes:
    a main steering plate coupled to the main cowl crossbar and having coupling holes at both sides;
    sub-steering plates coupled to both sides of the main steering plate and each sub-steering plate having a mounting hole corresponding to the coupling holes;
    reinforcing members inserted in between the main steering plate and the sub-steering plates, supporting an inner side of the main steering plate and outer sides of the sub-steering plates, and each reinforcing member having a through-hole corresponding to each of the coupling and the mounting holes; and
    steering bolts tightened to the steering module sequentially through the coupling holes, the through-holes, and the mounting holes.

7. The cowl cross member assembly of claim 6, wherein the reinforcing members are formed in a shape of a pipe.

8. A cowl cross member assembly for a vehicle which improves convenience in mounting a steering module and avoids interference with an audio system in a vehicle, the cowl cross member assembly comprising:
    a main cowl crossbar disposed at a driver's seat in a width direction of the vehicle;
    a sub-cowl crossbar disposed at a passenger's seat in the width direction of the vehicle;
    a connection unit disposed between one end of the main cowl crossbar and one end of the sub-cowl crossbar and connecting the main cowl crossbar with the sub-cowl crossbar;
    a cowl bracket coupled to the main cowl crossbar at one side and coupled to a vehicle body at another side;
    a steering bracket coupled to a bottom of the cowl bracket and coupled to the steering module; and
    a steering mounting unit coupled to the main cowl crossbar at one side and coupled to the steering module at another side,
    wherein the steering mounting unit includes:
        a main steering plate coupled to the main cowl crossbar and having coupling holes at both sides;
        sub-steering plates coupled to both sides of the main steering plate and each sub-steering plate having a mounting hole corresponding to the coupling holes;

reinforcing members inserted in between the main steering plate and the sub-steering plates, supporting an inner side of the main steering plate and outer sides of the sub-steering plates, and each reinforcing member having a through-hole corresponding to each of the coupling and the mounting holes; and steering bolts tightened to the steering module sequentially through the coupling holes, the through-holes, and the mounting holes.

9. The cowl cross member assembly of claim 8, wherein the reinforcing members are formed in a shape of a pipe.

\* \* \* \* \*